May 29, 1923.

J. S. BUCKWALTER

FRUIT JAR HOLDER

Filed Nov. 30, 1921

Patented May 29, 1923.

1,456,671

UNITED STATES PATENT OFFICE.

JACOB S. BUCKWALTER, OF PHILADELPHIA, PENNSYLVANIA, ASSIGNOR OF ONE-HALF TO LEWIS H. SHANK, OF PARADISE, PENNSYLVANIA.

FRUIT-JAR HOLDER.

Application filed November 30, 1921. Serial No. 518,842.

*To all whom it may concern:*

Be it known that I, JACOB S. BUCKWALTER, a citizen of the United States, residing at Philadelphia, in the county of Philadelphia and State of Pennsylvania, have invented certain new and useful Improvements in Fruit-Jar Holders, of which the following is a specification.

The present invention relates to fruit jar holders and consists in the combinations and arrangements of elements hereinafter described and particularly set forth in the accompanying claim.

The invention has for its purpose to provide an article of this character which will securely hold a fruit jar, or other type of jar, for transporting the same from one place to another; or for securing the same with one hand for the purpose of unscrewing the cap of the jar with the other hand.

A further purpose of the invention resides in providing a fruit jar holder with a pliable or soft strip to engage with the surface of the jar proper to the end of bringing the same into intimate contact with metal parts, and it is proposed to make said strip of sufficient width to evenly distribute the pressure of the gripping member against the jar body without liability of cracking or otherwise injuring the same.

Another purpose of the invention resides in forming one edge of the jar embracing band with a curved or inturned portion, to the end that the same will closely fit against that portion of the fruit jar known as the "shoulder," which is the strongest part of the jar body, and which will further serve as a supporting element or ledge in lifting the jar from one position to another.

The invention is shown by way of illustration in the accompanying drawing, wherein:—

Figure 1:
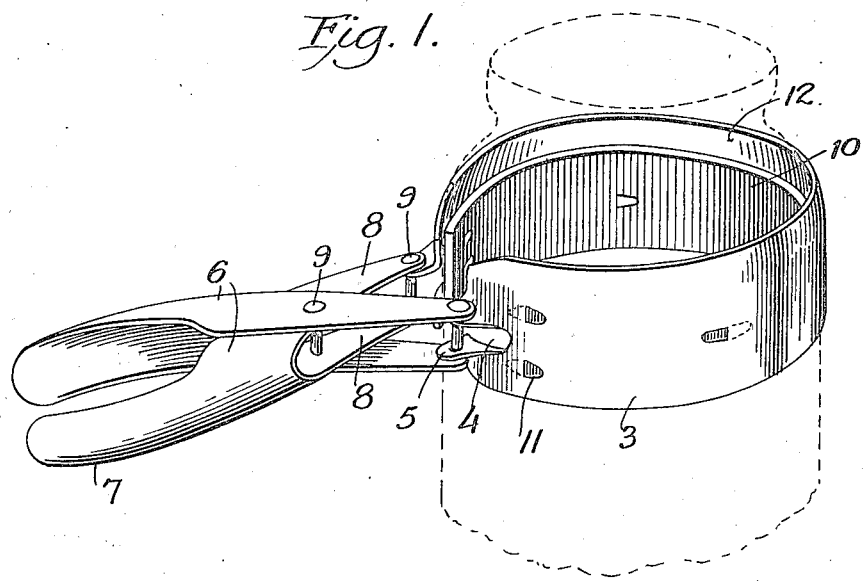
Figure 2:
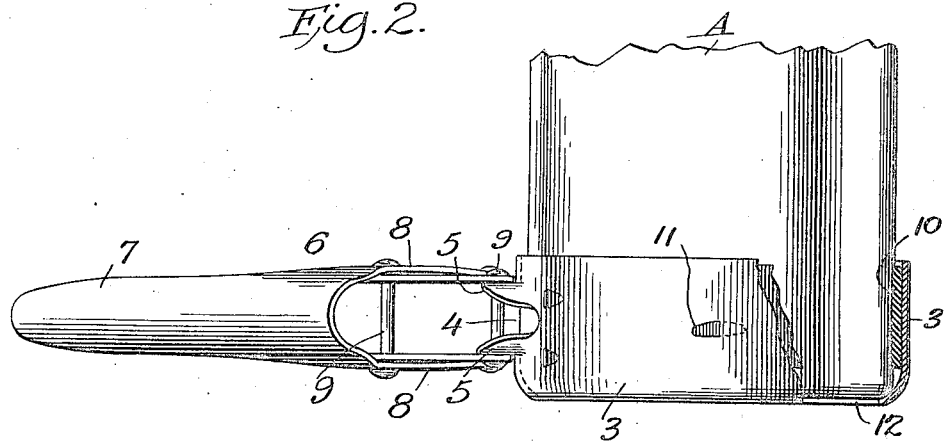

Figure 1 is a perspective view thereof showing the jar holder in applied position; and Figure 2 is a side elevational view thereof, partly broken away, showing another adaptation of the jar holder.

Referring to the construction in further detail, 3 designates a partially circular band of suitable metal and of appropriate width and thickness. The respective ends of said band are cut away, as at 4, and slightly upturned to provide a pair of ears or lugs 5 at each end after the manner shown. Said ears serve for connecting the band portion 3 with the pair of tongs 6 for manipulating said band.

Each of the tong members 6 is constructed from a single piece of suitable sheet metal having the required strength and is designed with a curved hand-gripping portion 7 and a pair of parallel portions 8 through which the connecting pin 9 passes to secure the parts to the ears 5, as disclosed. The two handles are assembled one within the other and operate on the pivot pin 9 that is located at substantially the point where the parallel portions 8 conjoin with the hand-gripping part 7.

A pliable strip 10 of any suitable material is secured to the strip 3 on the inner face thereof and has for its function to engage directly with the jar body with sufficient resiliency to prevent cracking of the jar when the handles 8 are drawn together under normal pressure. The strip 10 is secured to the band 3 by tongues or prongs 11 struck from said band and penetrating the rubber and crimped on the inner surface of said strip as shown.

One edge of the band 3, as at 12, is crimped and has for its function to provide a suitable bearing surface or ledge contact with that part of an ordinary fruit jar known as the "shoulder," which is virtually the strongest part of the jar, to thereby provide an additional bearing element when the device is actually clamped against the body of the jar in its normal usage. Said curved portion 12 has the additional function of serving as a supporting or bearing element that engages against the bottom edge of the jar A when the latter is to be lifted from one position to another in the manner illustrated in Figure 2.

The illustration shows a particular embodiment of the invention though it is understood, of course, that the invention may be carried out in other ways, and that therefore the present disclosure is to be considered in an illustrative sense only and not as a limiting one.

Having thus described the invention, what is claimed as new is:

A combined fruit jar holder and lifter comprising a flexible metallic band adapted to embrace the body of the jar, the respective end portions of said band having integral and up-turned portions providing pairs of perforated lugs, a pair of pivotally mounted handles connected to said lugs for contracting the band against the jar, one edge of said band being crimped inwardly to form a ledge for engaging against the shoulder of the jar when in one position, and providing a supporting element for the jar when applied thereto in another position.

In testimony whereof I affix my signature.

JACOB S. BUCKWALTER.